(12) United States Patent
Bright

(10) Patent No.: US 6,173,193 B1
(45) Date of Patent: Jan. 9, 2001

(54) VOICE PROMPT SYSTEM FOR FIXED CELLULAR TERMINAL DIALING

(75) Inventor: Randy Bright, Pittsboro, NC (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/149,463

(22) Filed: Sep. 8, 1998

(51) Int. Cl.[7] .................................................. H04B 1/38
(52) U.S. Cl. ................................................. 455/563; 455/556
(58) Field of Search .................................. 455/556, 563, 455/557, 553, 554, 570; 379/89; 381/42

(56) References Cited

U.S. PATENT DOCUMENTS

| 4,737,976 | 4/1988 | Borth et al. ............................. 379/58 |
| 5,602,900 | * 2/1997 | Hattori .................................. 455/563 |
| 5,911,123 | * 6/1999 | Shaffer er al. ........................ 455/556 |

FOREIGN PATENT DOCUMENTS

| 0 569 314 A1 | 11/1993 | (EP) . |
| 2 330 274 | 4/1999 | (GB) . |
| PCT/US99/ 20435 | 3/1999 | (WO) . |

* cited by examiner

*Primary Examiner*—Reinhard J. Eisenzopf
*Assistant Examiner*—Sam Bhattacharya
(74) *Attorney, Agent, or Firm*—Jenkens & Gilchrist, P.C.

(57) ABSTRACT

A fixed cellular interface system is disclosed that includes an interface system arranged between a standard telephone unit and a fixed cellular terminal. The interface system includes a voice prompt system, which can be programmed to generate speech using the native language for the geographical region involved. The voice prompt system detects the user of the POTS phone going "off hook", and vocally prompts the user to enter the desired number followed by the "#" sign. The interface system converts the received "#" sign to a "SEND" signal. The interface system transfers the dialed number followed by the "send" signal to the fixed cellular terminal which initiates the call to the cellular system.

16 Claims, 2 Drawing Sheets

VOICE PROMPT SYSTEM FOR FIXED CELLULAR TERMINAL DIALING

DESCRIPTION OF RELATED ART

Most people who already have telephone service take their telephone service for granted. They do not realize that in many locations telephone service is a limited resource, and that service providers are often hard pressed to offer that service to all who desire it. Wire-based telephone service providers simply cannot keep up with the recent surge in demand for telephone service. While a large portion of this demand can be traced to the increased use of facsimile machines (which each may require a separate telephone number), an equally significant source of demand can be traced to the increased numbers of people who now want and can afford telephone service. Many times, the increases in population and accompanying increases in demand for telephone service occur in areas where the existing wire-based telephone system infrastructure is either inadequate to handle the increased demand or is completely nonexistent. In such cases, people must wait for the service provider to take the steps needed to establish the required telephone system and catch-up with the demand. Waits as long as several months for a new telephone number, and several years for the installation of wire-based telephone systems having adequate capacity, are not uncommon in heavily populated cities or remote locations.

The planning costs involved in expanding existing or initiating new wire-based telephone systems are enormous when you consider the need for both the acquisition of rights of way and the renovation or construction of the service providing infrastructure (comprising, for example, the switching networks and the laying or stringing of telephone cable). However, before making these expenditures, wire-based telephone service providers must know (or be able to accurately project) exactly where their customers will be located, how many customers will be there, and when they are going to arrive and need the service. It is often the case that service providers act in a reactionary rather and proactive manner with respect to subscriber demand, and are accordingly not prepared to meet the increases in demand in a timely fashion. This failure is caused primarily by the significant time delay experienced from the point of approving the provision of a wire-based telephone system and its actual installation and placement into operation. These delays have caused telephone service providers to re-think the use of conventional wire-based telephone systems when addressing pending needs for telephone service initiation or expansion.

Cellular telephone systems provide an attractive alternative to conventional wire-based telephone systems, especially in connection with the provision of new or expanded telephone service in heavily populated or remote areas where significant increases in demand are or have been encountered. The expense, aggravation and time involved in acquiring rights of way and establishing the infrastructure to provide telephone service are obviated or substantially reduced with the installation and use of a cellular telephone system. However, the cost to the subscriber on a monthly or per call basis often drastically exceeds the cost for similar activities incurred with respect to wire-based telephone systems. Furthermore, the mobility advantage of cellular telephone systems, which is accounted for in the increased subscriber cost of the service, is often a feature that many telephone service users do not want to pay for or necessarily need.

Accordingly, efforts have been made to couple cellular systems with conventional analog telephones and provide a hybrid telephone system wherein telephone sets are fixed at certain locations as in a wire-based system but instead access the telephone network using radio frequency communications in a cellular environment. Such systems, conventionally referred to as fixed cellular systems, interface a conventional analog telephone set, like that used in wire-based telephone systems, with a radio frequency transceiver, like that used in a mobile telephone, operating within a cellular telephone system. The primary advantages of fixed cellular systems are the elimination of the costs and hassles of acquiring rights of way and laying or stringing telephone cables, and the ease and swiftness with which the system may be installed and made operational. The availability of a fixed cellular system thus offers service providers a tool for quickly reacting to increases in demand at a reasonable provider and subscriber expense.

In spite of the fact that the subscriber's communication device (telephone set) looks like a conventional analog wire-based telephone set, in a fixed cellular system the telephone set unfortunately operates like a cellular mobile telephone, and thus suffers from the known caller interface disadvantages and inconveniences experienced with cellular service. For example, when a call is to be initiated in a fixed cellular system, the phone number must be first completely dialed into the telephone set through the keypad and then sent to the cellular system for processing. No instantaneous feedback is provided to the caller during the dialing operation concerning the propriety of the entered numbers. The transmission of the dialed number over the cellular network is made only after the activation by the caller of a send button on the keypad. The caller must then wait while the cellular network side of the system selects the voice channel to carry the conversation and completes the call to the called party. The fixed cellular system caller interface accordingly and undesirably operates more slowly relative to, and in a manner completely foreign to the manner of operation experienced in, a conventional wire-based telephone system.

Efforts have been made to have the fixed cellular system mimic operation of the wire-based telephone system with respect to some aspects of the caller interface. For example, it is known to include functionality for simulating at the cellular system interface the dial tone and reorder tones heard on conventional wire-based systems before and during the caller dialing operation. With these features, the analog telephone set connected to a fixed cellular system operates more like a conventional wire-based telephone set than a cellular mobile station. However, improvements in this caller interface are still needed with respect to the speed with which the connection to the called party is established. Furthermore, there would be an advantage if the caller interface also functioned to ease the ability for a caller to make an outgoing call.

SUMMARY OF THE INVENTION

A fixed cellular system is provided that includes an interface system arranged between a standard telephone unit (wireline telephone terminal) and a fixed cellular phone. The interface system includes a voice prompt system, which can be programmed to generate speech using the native language for the geographical region involved. The voice prompt system includes detection circuitry which detects the standard telephone unit being taken "off hook", and then vocally prompts the user to enter the desired number followed by the "#" sign. The interface system converts the received "#" sign to a "SEND" signal. The interface system sends the dialed number and the "send" signal to the fixed cellular terminal and a call is initiated to the cellular system.

An important technical advantage of the present invention is that the responsibility of determining when a user has finished dialing is placed with the user instead of with the interface system, which makes the present approach easier to implement and more reliable.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
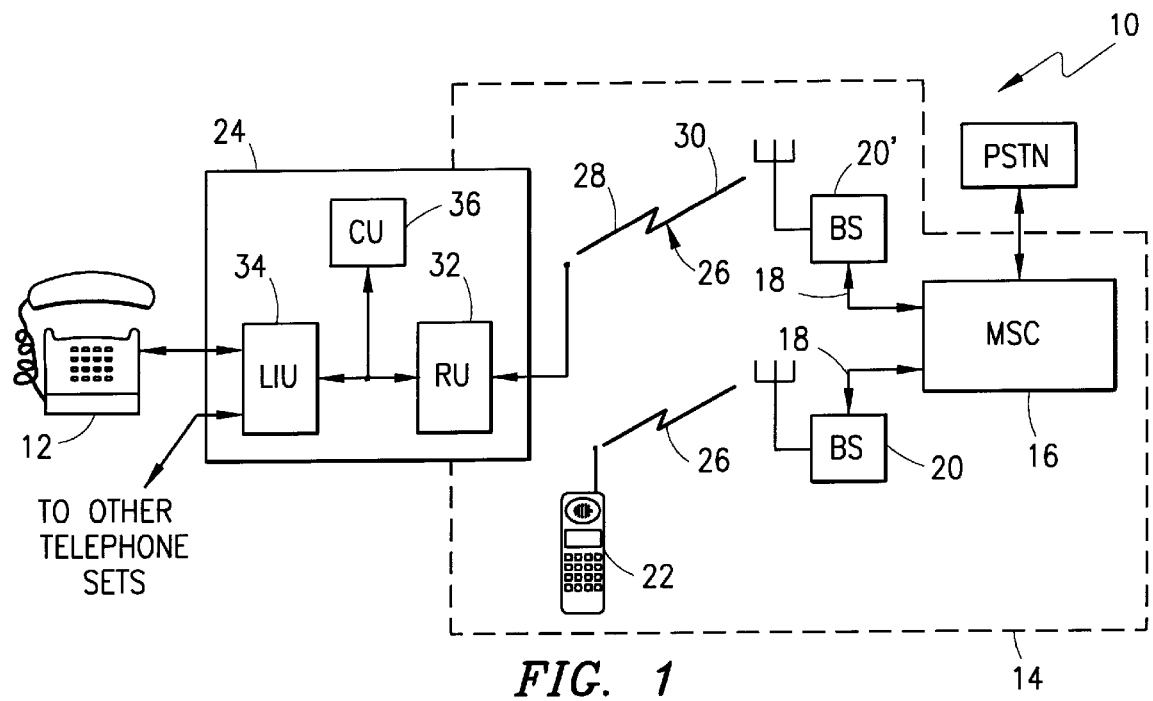
FIG. 1 is a block diagram of a fixed cellular telephone system.

Reference is now made to FIG. 1 wherein there is shown a block diagram of a fixed cellular telephone system 10 in accordance with the present invention. A standard telephone set 12 of the DTMF tone dial variety is connected for operation to a cellular telephone network 14. The cellular telephone network 14 comprises a mobile switching center (MSC) 16 connected by communications links 18 to a plurality of base stations (BS) 20. The connection between the standard telephone set 12 and the cellular telephone network 14 is made through a fixed cellular terminal 24 operating to establish radio frequency communications links with a proximately located base station 20'.

The radio frequency communications links established between the base stations 20 and any cellular mobile stations 22, and between the base station 20' and the fixed cellular terminal 24 are effectuated over an air interface 26 comprising at least one control channel (CC) 28 and a plurality of voice channels (VC) 30 per base station. The control channels 28 comprise bi-directional communications channels for carrying command and control signals between the base stations 20 and the mobile stations 22, and between the base station 20' and the fixed cellular terminal 24. The voice channels 30, on the other hand, comprise bi-directional communications channels for carrying voice communications between the base stations 20 and the mobile stations 22, and between the base station 20' and the fixed cellular terminal 24. Any type of cellular network air interface 26 that provides for both control and voice channels 28 and 30, respectively, may be utilized by the cellular telephone network 14, including those air interfaces specified for use in the well known AMPS, D-AMPS and GSM cellular telephone systems. The control channels or voice channels in the air interface 26 may therefore comprise either or both a certain radio frequency carrier in an analog cellular telephone system and/or a certain time slot provided within a carrier in a digital cellular telephone system, and the fixed cellular terminal may operate in either or both an analog or digital mode, respectively.

The fixed cellular terminal 24 operates as an interface between one or more standard telephone sets 12 and the cellular network 14. When operable as a multi-line terminal, the fixed cellular terminal 24 functions like a private branch exchange (PBX) to allow a plurality of subscriber telephone sets at one general location (for example, a business or a small town) to be provided with fixed cellular telephone service. As a single-line terminal, on the other hand, the fixed cellular terminal 24 provides a connection for a single subscriber telephone set at one given location (for example, a house). The fixed cellular terminal 24 may accordingly comprise either the Single-line or Multi-line Terminal manufactured by Ericsson for the CMS 8800 AMPS/D-AMPS Fixed Cellular telephone system configured in accordance with the present invention to provide an improved caller interface as will be described.

The fixed cellular terminal 24 comprises a radio unit (RU) 32, a line interface unit (LIU) 34 and a control unit (CU) 36. The radio unit 32 provides all the radio frequency communications functionality typically found in a mobile station 22 for a cellular telephone system. Thus, the radio unit 32 includes a tunable radio frequency transceiver device for accessing the radio frequency carriers (and the digital cellular system TDMA or CDMA time slots therein if applicable) for the control channels 28 and voice channels 30 provided within the air interface 26. The line interface unit 34 provides the functionality for interfacing the one or more connected standard telephone sets 12 to the radio unit 32. The control unit 36 manages the operation of the radio unit 32 and the line interface unit 34 to provide the signal conversions required to establish and terminate calls to and from the line interface unit 34 through the cellular network 14. The control unit 36 further manages all the necessary information required for establishing and authenticating calls over the cellular network 14.

Figure 2:
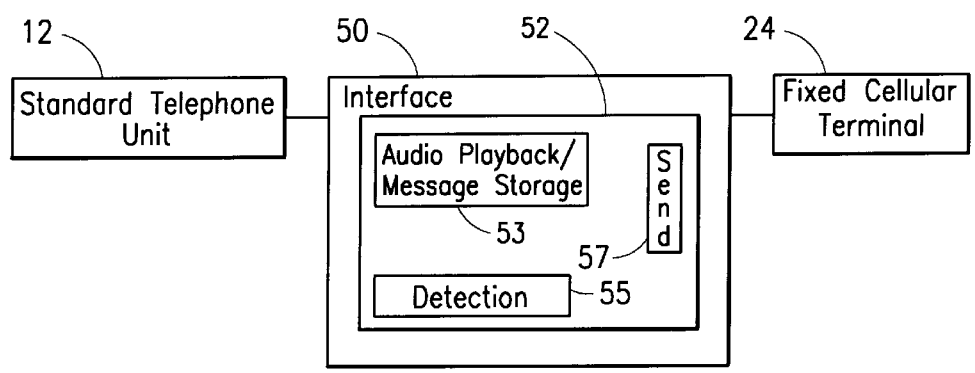
FIG. 2 is a functional block diagram of the interface system of the present invention between a standard telephone unit and a fixed cellular terminal.

Referring now to FIG. 2, there is more particularly illustrated a functional block diagram of the interface system 50 of the present invention enabling voice prompted call dialing between a standard telephone set 12 and fixed cellular terminal 24. The standard telephone unit 12 comprises an analog or digital telephone unit enabling a user to enter the digits of a telephone number to initiate a call to a destination number. The interface system 50 includes a voice prompt system 52. The voice prompt system 52 may be implemented in hardware or software and provides an audio message voice prompt to a user of the standard telephone unit 12.

The audio playback and message storage circuitry 53 are responsible for providing the audio message to the standard telephone 12 in response to detection of an off-hook condition (or some other type of call initiation condition) by detection circuitry 55. The audio message instructs the user of the standard telephone unit 12 to enter a telephone number followed by the "#" sign (call completion instructions). The user does not have to wait for the end of the audio message to start entering a telephone number. The entered digits and "#" sign are transmitted to the interface system 50 wherein the "#" sign is converted into a "send command" by a send function 57. Thus, the interface system 50 would generate a sequence as follows in response to the entry of the digits 555-1111#.

555-1111 "send"

The call destination number including the appended "send" command is forwarded to the fixed cellular terminal 24. When the send command at the end of the number is received by the fixed cellular terminal 24, the outgoing call is initiated from the fixed cellular terminal 24 to the cellular network 14 (FIG. 1).

Figure 3:
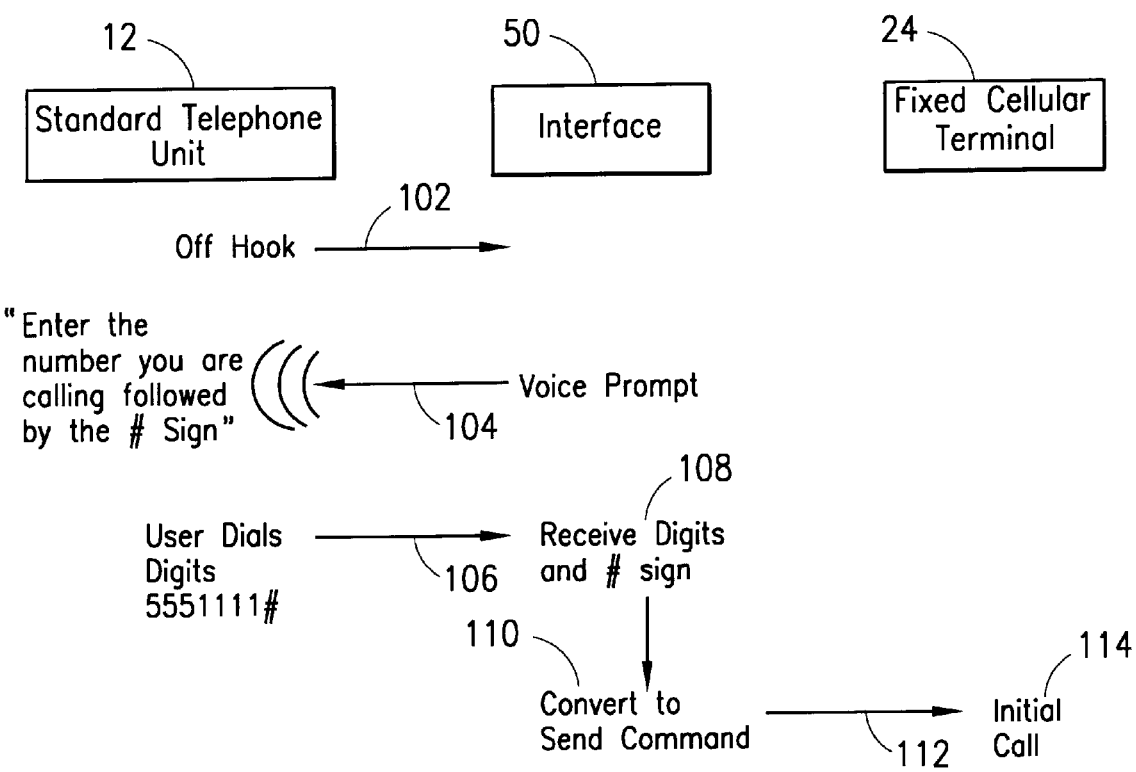
FIG. 3 is a signal diagram illustrating the method of the present invention.

FIG. 3 illustrates a sequence of events that can occur with a method 100 for voice prompting a user to follow an appropriate dial up procedure for use with the interface system 50 and fixed cellular terminal 24 shown in FIG. 2, in accordance with the preferred embodiment of the present invention. Referring now to FIGS. 2 and 3, at step 102 of the method 100, the user of the standard telephone unit 12 picks up the handset (e.g., the phone goes "off hook"). The detection circuitry 55 of the interface system 50 detects the "off hook" signal. In response to the detected "off hook" signal, at step 104, audio playback and message storage circuitry 53 in the interface system 50 generates and transmits an appropriate audio message to the standard telephone unit 12, which prompts the user to enter a phone number to be called, followed by the "#" sign. Note that the use of a "#" sign is for illustrative purposes only and not intended to so limit the invention. For example, any appropriate symbol or code (e.g., "*") can be used. At step 106, in response to the audio message from the interface system 50, the user enters the digits of the number being called, followed by the "#" sign. At step 108, the interface system 50 receives the digits and "#" sign sent from the standard telephone unit 12. At step 110, the send function 57 of the interface system 50 converts the "#" sign to a "SEND" signal. The interface system 50 transfers, at step 112, the dialed number followed by the "send" signal to the fixed cellular terminal 24 and initiates, at step 114, the call over the cellular system 14 (FIG. 1). The call connection is maintained until either the local user or called party hangs up, whereby the call is disconnected.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A fixed cellular telephone interface system for establishing a call connection between a standard telephone unit and a remote telephone, comprising:

a fixed cellular terminal; and an interface connected between said standard telephone unit and said fixed cellular terminal, said interface for sending a voice message from the interface to said standard telephone unit in response to a call initiation condition at said standard telephone unit, said voice message including a call completion instruction, said interface further responsive to a determination that a user of said standard telephone unit has followed said call completion instruction for initiating the call connection via the fixed cellular terminal.

2. The fixed cellular telephone interface system of claim 1, wherein said call initiation condition comprises an off-hook condition.

3. The fixed cellular telephone interface system of claim 1, wherein said call completion instruction comprises an instruction to enter a predetermined command upon dialing completion.

4. The fixed cellular telephone interface of claim 3, wherein the interface further includes means for converting the predetermined command into a send command.

5. The fixed cellular telephone interface system of claim 1, wherein said call completion instruction includes a vocal prompt from said voice prompt system to enter a called party number followed by a "#" sign.

6. The fixed cellular telephone interface system of claim 1, wherein the interface further includes detection circuitry for detecting an off-hook condition of the standard telephone unit.

7. An interface for interconnecting a standard telephone unit with a fixed cellular terminal, comprising:

voice prompt circuitry for transmitting a voice message to said standard telephone unit in response to a call initiation condition at said standard telephone unit, said voice message including a call completion instruction;

detection circuitry for detecting the call initiation condition; and circuitry for converting the call completion instruction received from the standard telephone unit in response to the voice message into a send command for transmission to the fixed cellular terminal.

8. The fixed cellular telephone interface system of claim 7, wherein said call initiation condition comprises an off-hook condition.

9. The fixed cellular telephone interface system of claim 7, wherein said call completion instruction comprises an instruction to enter a predetermined command upon dialing completion.

10. The fixed cellular telephone interface system of claim 7, wherein said call completion instruction includes a vocal prompt from said voice prompt system to enter a called party number followed by a "#" sign.

11. A method for initiating a call connection between a standard telephone unit and a remote telephone using a fixed cellular interface coupled to the standard telephone unit, comprising the steps of:

recognizing, in the interface, a call initiation condition at the standard telephone unit;

responsive to said call initiation condition, sending a voice prompt message from said interface to said standard telephone unit, said voice prompt message including a call completion instruction; and responsive to a determination that said user has followed said call completion instruction, providing a command to a fixed cellular terminal to initiate said call connection.

12. The method of claim 11, wherein said call initiation condition comprises an off-hook condition.

13. The method of claim 11, wherein said call completion instruction comprises an instruction to enter a predetermined command upon dialing completion.

14. The method of claim 11, wherein said call completion instruction includes a vocal prompt to enter a called party number followed by a "#" sign.

15. The method of claim 11, wherein said establishing step comprises responsive to receiving said call completion instruction, providing a "SEND" signal to the fixed cellular terminal.

16. The method of claim 11, wherein the recognizing, sending and establishing steps are performed at a fixed cellular system interface system.

* * * * *

UNITED STATES PATENT AND TRADEMARK OFFICE
CERTIFICATE OF CORRECTION

PATENT NO. : 6,173,193 B1
DATED : January 9, 2001
INVENTOR(S) : Randy Bright

Page 1 of 1

It is certified that error appears in the above-identified patent and that said Letters Patent is hereby corrected as shown below:

Column 1,
Line 3, add (before <u>Description of Related Art</u>)
-- BACKGROUND OF THE INVENTION
<u>Technical Field of The Invention</u>
The present invention relates in general to the cellular communications field and, in particular, to a system and method for prompting a user to initiate a dial-up procedure for a fixed cellular phone system. --

Signed and Sealed this

Sixth Day of November, 2001

Attest:

NICHOLAS P. GODICI
Attesting Officer
Acting Director of the United States Patent and Trademark Office